Feb. 10, 1959 T. E. LEONARD 2,873,407
PEDAL AND SWITCH STRUCTURE FOR VEHICLES
Filed Feb. 7, 1955
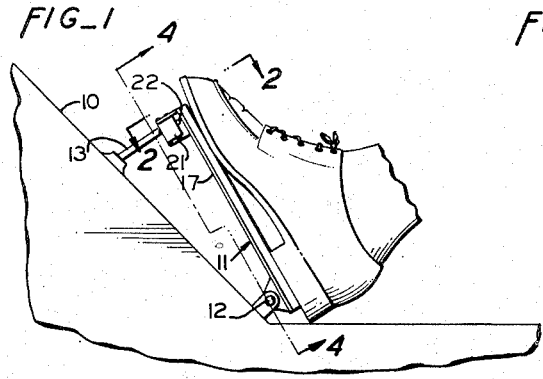
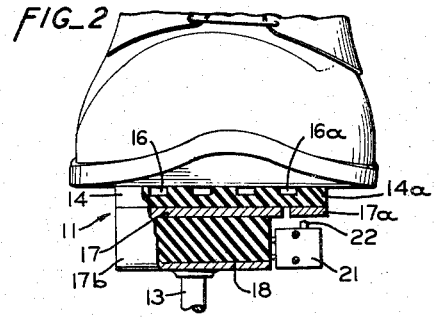
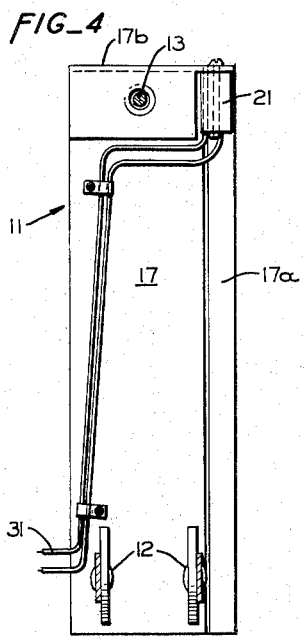
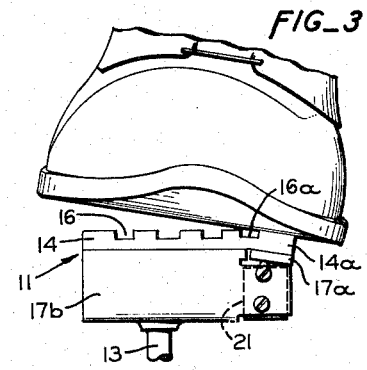
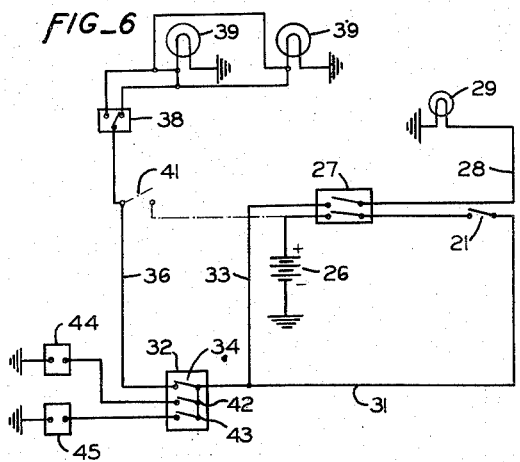
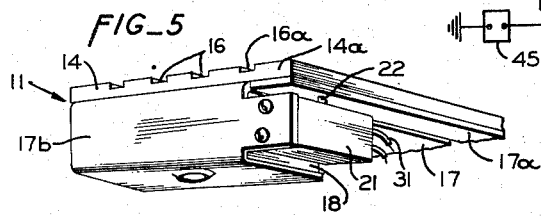
INVENTOR.
THOMAS E. LEONARD
BY
ATTORNEY ң
United States Patent Office 2,873,407
Patented Feb. 10, 1959

2,873,407

PEDAL AND SWITCH STRUCTURE FOR VEHICLES

Thomas E. Leonard, San Jose, Calif.

Application February 7, 1955, Serial No. 486,325

10 Claims. (Cl. 315—80)

The present invention relates to the control of automotive equipment from a switch and pedal structure, and is concerned more particularly with the provision of a safe passing control whereby the headlights can be switched "on" when moving out into a passing lane of traffic or when approaching any condition where a warning may be advisable, by a switch in the pedal structure operated by the foot of the driver.

In the driving of automobiles in traffic it is common practice by some drivers to switch on their headlights when moving out into a passing lane, i. e. in a 3-lane highway, to provide ample warning to other vehicles of the position of the vehicle. It is desirable that this signalling be performed without the driver's hands leaving the steering wheel, and it is also desirable in connection with other auxiliary equipment on the automobile that a control can be exercised by movement of the foot of the operator on the accelerator pedal, without further attention by the operator or driver.

In accordance with the instant invention, the pedal structure for the accelerator is of special construction and incorporates a movable portion which can be operated by a lateral twisting movement of the foot of the driver so that more pressure is exerted on a movable edge portion of the pedal, such control being exerted without changing the pedal or throttle setting. In accordance with my invention, this switch in the pedal structure is placed in the lighting circuit and serves to turn on the headlights during the interval that the movable edge portion of the pedal is operated and to turn off the headlights when the pressure on this movable portion is released.

It is a further object of the invention to place on the dashboard of the automobile a selector switch by means of which this accelerator pedal switch can be placed in a controlling relation selectively with the headlights, or with other controllable parts of the automobile, i. e. with the radio switch, or with an auxiliary gear shift mechanism in the case of trucks, when it is desired to change the speed ratio of the drive without moving the gear shift lever.

The above and other objects of the invention are attained as described in the accompanying specification taken in connection with the attached drawings, in which:

Figure 1 is a view of a portion of the driver's compartment of a vehicle, showing the accelerator pedal structure with the foot of the operator thereon in side elevation.

Figure 2 is the transverse sectional view through the pedal structure line 2—2 in Figure 1, with the driver's foot shown in elevation.

Figure 3 is a view similar to Figure 2 but showing the foot of the operator tilted so as to operate the control portion of the pedal structure.

Figure 4 is a bottom elevational view of the pedal structure with certain portions showing in action.

Figure 5 is a fragmentary perspective view of the structure.

Figure 6 is a schematic wiring diagram showing the relation of certain electrical components of an automobile when equipped with the present invention.

Referring to the drawings there is shown a floor board 10 in the driver's compartment of an automobile or truck on which the accelerator pedal 11 is pivotally mounted at 12 and is suitably connected with a throttle linkage 13. The pedal structure includes a molded rubber portion 14, having longitudinal grooves 16 therein and having a metal reinforcing and supporting plate 17 secured thereto which extends longitudinally along the pedal structure and reinforces the rubber portion 14 through a portion of its width. One side edge of the plate terminates adjacent a groove 16a and the remaining portion 14a of the pedal comprises a movable portion or strip connected to the body portion by a rubber hinge. The portion 14a can be operated to perform an auxiliary control function by sidewise tilting of the foot of the operator to a position as shown in Figure 3. The portion 14a may also be provided with a metal reinforcing strip 17a.

Preferably the plate 17 is formed with a U-shaped end 17b at the upper end of the pedal to receive a rubber insert 18 to which the linkage 13 connects. The end 17b provides a mounting for a suitable enclosed switch structure 21. This switch 21 has its operating button 22 adjacent to the movable section 14a of the pedal structure. The switch 21 may be of a normally open, a normally closed, or of a cycling, type, in accordance with the type of operation which it is designed to control, and in the present instance in connection with a safe passing light control as described, the switch is preferably of the normally open type.

It will be seen that the longitudinal groove 16a provides a weakened section longitudinally of the pedal structure and provides a rubber hinge for the movable control portion 14a of the pedal structure which, after depression as shown in Figure 3, will return to its horizontal position shown in Figure 2. In Figure 3 the strip 17a has engaged the end 17b as a limit stop so that the entire pedal structure can be operated, and the switch 21 is protected against destructive pressure. If desired, a metal spring strip can be placed laterally on the pedal structure in order to insure return to the normal position.

Referring to Figure 6 there is shown a schematic wiring diagram in which the battery of the automobile is indicated at 26, this being connected to one side of a double pole switch 27 located on the dash of the automobile providing an "on and off" switch for the control system, one side of this switch being connected by a lead 28 to an indicator light 29 on the dash of the automobile and the other side of this switch being connected to the pedal switch 21, by a lead 31, which extends to selector switch 32 on the dash of the automobile and is also connected by lead 33 to one side of the switch 27 and thence by lead 20 to light 29.

The upper switch 34 of the selector switch 32 is associated with the safe passing control through a lead 36 which extends through the conventional dimmer switch 38 and to the headlights 39 which are connected to ground in the usual manner. The switch 41 shown in dotted lines indicates the usual type of light control switch on the dash of the automobile.

The remaining switches 42 and 43 of the selector switch 32 may be connected respectively to the radio control switch 44, such as a signal seeking switch, and the gear shift control solenoid 45, or other devices that may be electrically controlled.

In operation, assuming the driver is to be driving in the daytime, and assuming switches 27 and 34 to be in "on" condition, when the driver begins to pass, he tilts his foot on the pedal structure lever so as to depress the movable portion 14a thereof, as indicated in Figure 3, and this in effect bypasses the open headlight switch 41 and places the headlights 39 in an "on" condition without affecting the tail lights of the system.

During the daytime operation, or otherwise, as desired, the operator can set the selector switch 32 so that either of the switches 42 or 43 is closed, thereby transferring the control of the pedal structure switch to the associated component.

While I have shown and described a preferred form of invention, it is apparent that the invention is capable of variation and modification from the form shown so that the scope thereof should be limited only by the scope to claims appended hereto.

I claim:

1. In an automobile, an accelerator pedal having means for mounting on the floor board of the automobile, said pedal also having a main portion and a hinged portion movable with respect to said main portion, electrical contact means carried by said accelerator pedal, and an electrical circuit connected to said contact means, said contact means being adapted to control said electrical circuit in response to movement of said hinged portion with respect to said main portion.

2. A foot operated control pedal having a main body portion and a control portion hinged thereon, electric contact means carried by said pedal, said electric contact means being adapted to be controlled in response to movement of said control portion with respect to said body portion.

3. A foot operated control pedal of resilient material having a main body portion and a control portion, a weakened portion of said material forming a hinge between said portions, and electric contact means carried by said pedal, said electric contact means being adapted to be controlled in response to movement of said control portion with respect to said body portion.

4. In an automobile, an accelerator pedal having means for mounting in the automobile, and having a main body portion and a longitudinal edge portion movably mounted on the main body portion for movement in response to lateral tilting movement of the foot of a person driving the automobile, electric contact means and an electric circuit controlled by said electric contact means, said electric contact means being carried by said body portion and disposed in operative relation to said edge portion, whereby tilting movement of the foot controls said electric contact means and said electric circuit connected thereto.

5. In an automobile, an accelerator pedal having means for mounting in the automobile, and having a main body portion and an edge portion movably mounted on the main body portion for movement in response to a control movement of the foot of a person driving the automobile, electric contact means and an electric circuit controlled by said contact means, said electric contact means being carried by said body portion and disposed in operative relation to said edge portion, whereby tilting movement of the foot controls said electric contact means and said electric circuit connected thereto.

6. In an automobile, an accelerator pedal having means for mounting in the automobile, and having a main body portion and a longitudinal edge portion movably mounted on the main body portion for movement in response to lateral tilting movement of the foot of a person driving the automobile, electric contact means and an electric circuit controlled by said electric contact means, said electric contact means being carried by said body portion and disposed in operative relation to said edge portion, whereby tilting movement of the foot controls said electric contact means and the electric circuit connected thereto, said pedal including means forming a limit stop for movement of said edge portion.

7. In an automobile including a battery and headlights, an accelerator having means for mounting in the automobile, and having a main body portion, and a longitudinal edge portion movably mounted on the main body portion for movement in response to lateral tilting movement of the foot of a person driving the automobile, and means for operatively connecting said battery and said headlights including electrical contact means carried by the main body portion and disposed in operative relation to said movably mounted portion, whereby tilting movement of the foot controls said headlights.

8. In an automobile including a battery and headlights, an accelerator having means for mounting in the automobile, and having a main body portion, and a control portion movably mounted on the main body portion for movement in response to tilting movement of the foot of a person driving the automobile, and electrical connections for operatively connecting said battery and said headlights including electrical contact means carried by the main body portion and disposed in operative relation to said control portion, whereby tilting movement of the foot controls said electrical contact means and said headlights connected thereto.

9. In a structure as recited in claim 1, in which said means controlled by said contact means includes a plurality of selectively settable electrical switches for a corresponding plurality of settable electrically controlled components of the automobile.

10. A foot operated pedal of resilient material having a main body portion and a control portion, a weakened portion of said material forming a hinge between said portions, electric contact means carried by said pedal for operation in response to movement of said control portion with respect to said body portion, said resilient material acting as a return means for said control portion after movement thereof.

References Cited in the file of this patent

UNITED STATES PATENTS

| | | |
|---|---|---|
| 1,536,366 | Wiseman | May 5, 1925 |
| 1,710,819 | Griffin | Apr. 30, 1929 |
| 2,648,059 | Hostetler | Aug. 4, 1953 |
| 2,751,522 | Spangenberg | June 19, 1956 |